(12) United States Patent
Li et al.

(10) Patent No.: US 11,412,488 B2
(45) Date of Patent: Aug. 9, 2022

(54) RESOURCE ALLOCATION METHOD AND DEVICE

(71) Applicant: DATANG MOBILE COMMUNICATIONS EQUIPMENT CO., LTD., Beijing (CN)

(72) Inventors: Qinghua Li, Beijing (CN); Jinxi Su, Beijing (CN); Donghao Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 114 days.

(21) Appl. No.: 16/635,175

(22) PCT Filed: Aug. 2, 2018

(86) PCT No.: PCT/CN2018/098387
§ 371 (c)(1),
(2) Date: Jan. 30, 2020

(87) PCT Pub. No.: WO2019/024901
PCT Pub. Date: Feb. 7, 2019

(65) Prior Publication Data
US 2020/0205147 A1 Jun. 25, 2020

(30) Foreign Application Priority Data
Aug. 4, 2017 (CN) .......................... 201710662936.4

(51) Int. Cl.
*H04W 72/04* (2009.01)
*H04W 72/00* (2009.01)

(52) U.S. Cl.
CPC ..... *H04W 72/0413* (2013.01); *H04W 72/005* (2013.01); *H04W 72/0473* (2013.01)

(58) Field of Classification Search
None
See application file for complete search history.

(56) References Cited

U.S. PATENT DOCUMENTS

| 8,767,644 | B2 | 7/2014 | Wager et al. | |
|---|---|---|---|---|
| 2005/0105503 | A1* | 5/2005 | Cayla | H04J 3/16 370/346 |

(Continued)

FOREIGN PATENT DOCUMENTS

| CN | 1536904 A | 10/2004 |
|---|---|---|
| CN | 101227698 A | 7/2008 |

(Continued)

OTHER PUBLICATIONS

Alcatel-Lucent et al.,"Considerations on PRACH for LC-MTC" 3GPP TSG-RAN WG2 #90, Fukuoka, JAPAN, May 25-29, 2015, total 7 pages, R2-152674.

(Continued)

*Primary Examiner* — Michael J Moore, Jr.
*Assistant Examiner* — Gautam Sharma
(74) *Attorney, Agent, or Firm* — Kilpatrick Townsend & Stockton, LLP

(57) ABSTRACT

Embodiments of the present application provide a resource allocation method and apparatus, for allocating an uplink transmission resource to a terminal device. The method comprises: a terminal device receives a first corresponding relationship and a second corresponding relationship broadcast by a network device, and the first corresponding relationship comprises a corresponding relationship between a value range of channel state information and a grade corresponding to the terminal device, and the second corresponding relationship comprises a corresponding relationship between the grade corresponding to the terminal device and a set of uplink transmission resources; the terminal device determines a value of its channel state information and (Continued)

determines a grade corresponding to the terminal device according to the value of the channel state information of the terminal device and the first corresponding relationship; the terminal device determines, according to the grade of the terminal device and the second corresponding relationship.

14 Claims, 6 Drawing Sheets

(56) References Cited

U.S. PATENT DOCUMENTS

| | | | |
|---|---|---|---|
| 2007/0032200 A1* | 2/2007 | Taneja | H04L 1/0018 455/70 |
| 2010/0329107 A1 | 12/2010 | Yuk et al. | |
| 2011/0116460 A1* | 5/2011 | Kowali | H04L 47/621 370/329 |
| 2011/0176500 A1* | 7/2011 | Wager | H04W 74/0833 370/329 |
| 2012/0051299 A1* | 3/2012 | Thakolsri | H04W 28/22 370/329 |
| 2012/0057541 A1* | 3/2012 | Choi | H04W 72/10 370/329 |
| 2012/0099557 A1 | 4/2012 | Cho et al. | |
| 2012/0140649 A1* | 6/2012 | Choudhury | H04L 1/003 370/252 |
| 2012/0207047 A1* | 8/2012 | Liao | H04B 7/0645 370/252 |
| 2013/0065631 A1* | 3/2013 | Lu | H04L 1/0003 455/522 |
| 2013/0136068 A1* | 5/2013 | Johansson | H04W 88/085 370/329 |
| 2015/0304024 A1* | 10/2015 | Liu | H04W 72/082 370/337 |
| 2016/0285683 A1* | 9/2016 | Ulrich | H04W 48/16 |
| 2016/0295609 A1* | 10/2016 | Vajapeyam | H04W 74/0833 |
| 2017/0332247 A1* | 11/2017 | Hua | H04L 1/00 |
| 2018/0205497 A1* | 7/2018 | Wang | H04L 1/0057 |
| 2019/0104534 A1* | 4/2019 | Tsai | H04L 5/006 |

FOREIGN PATENT DOCUMENTS

| | | |
|---|---|---|
| CN | 102858012 A | 1/2013 |
| CN | 105050189 A | 11/2015 |
| WO | 2016161408 A1 | 10/2016 |
| WO | 2017045176 A1 | 3/2017 |
| WO | 2017052144 | 3/2017 |

OTHER PUBLICATIONS

Ericsson(rapporteur),"Email discussion report [95bis#27][LTE/NB-IoT] Reduced power class", 3GPP TSG-RAN2 Meeting #96, Reno, US, Nov. 14-18, 2016, total 11 pages, R2-168323.

3GPP TS 36.321 V14.3.0, 3rd Generation Partnership Project;Technical Specification Group Radio Access Network; Evolved Universal Terrestrial Radio Access (E-UTRA);Medium Access Control (MAC) protocol specification (Release 14), total 107 pages; Jun. 2017.

Sony,"Considerations on PRACH resources for NB-IoT, ASN.1", 3GPP TSG RAN WG2 NB-Meeting #93, St. Julian's, Malta, Feb. 15-19, 2016, total 5 pages, R2-161141.

* cited by examiner

RESOURCE ALLOCATION METHOD AND DEVICE

This application is a U.S. National Stage of International Application No. PCT/CN2018/098387, filed on Aug. 2, 2018, which claims the priority of Chinese Patent Application No. 201710662936.4 filed with the China National Intellectual Property Administration on Aug. 4, 2017 and entitled "Resource Allocation Method and Device", which is hereby incorporated by reference in its entirety.

FIELD

The application relates to the field of communication, in particular to a resource allocation method and device.

BACKGROUND

At present, in an uplink transmission resource allocation scheme in a Long Term Evolution (LTE) system, multiple information interactions between a network device and a terminal device is required for the network device to allocate uplink transmission resources to the terminal device. When changes occur at the terminal device side, for example, the physical distance between the terminal device and the network device changes, the network device needs to reallocate uplink transmission resources to the terminal devices. However, with the increase in the number of the terminal devices in the system, for example, the number of terminal devices in the 5th Generation (5G) system is greatly increased, and due to the fact that multiple information interactions between the network device and each terminal device is required to allocate uplink transmission resources to each terminal device by the network device according to the scheme, difficult implementation, high time consumption and high signaling overhead are caused in the uplink transmission resource allocation process.

In another uplink transmission resource allocation scheme, the network device notifies the terminal devices of their available uplink transmission resources, and the terminal devices can randomly select the resources for uplink transmission by the terminal devices from all the available uplink transmission resources notified by the network device. However, in this scheme, the multiple terminal devices may select the same uplink transmission resources, which will lead to resource collision, further resulting in low transmission efficiency of the terminal devices and even transmission failure.

To sum up, none of the existing uplink transmission resource allocation schemes can achieve satisfactory allocation of the uplink transmission resources to the terminal devices.

SUMMARY

The embodiments of the application provide a resource allocation method and device, which are used for allocating uplink transmission resources to terminal devices.

In a first aspect, the embodiments of the present application provide a resource allocation method, including: receiving, by a terminal device, a first correspondence relationship and a second correspondence relationship broadcast by a network device, where the first correspondence relationship includes a correspondence relationship between a value range of channel state information and a grade corresponding to the terminal device, and the second correspondence relationship includes a correspondence relationship between the grade corresponding to the terminal device and a set of uplink transmission resources; determining, by the terminal device, a value of channel state information of the terminal device, and determining, by the terminal device, the grade corresponding to the terminal device according to the value of channel state information of the terminal device and the first correspondence relationship; and determining, by the terminal device, a set of the uplink transmission resources corresponding to the terminal device according to the grade corresponding to the terminal device and the second correspondence relationship, and selecting, by the terminal device, an uplink transmission resource from the determined set of the uplink transmission resources.

In one possible design, the higher the grade corresponding to the terminal device in the second correspondence relationship, the better a quality of an uplink transmission resource included in the set of the uplink transmission resources corresponding to the grade.

In one possible design, the method further comprises: receiving, by the terminal device, an updated first correspondence relationship broadcast by the network device; and determining, by the terminal device, the grade corresponding to the terminal device according to the value of the channel state information of the terminal device and the updated first correspondence relationship.

In one possible design, the method also comprises: reporting, by the terminal device, the value of the channel state information of the terminal device to the network device, where the reported value of channel state information is used for the network device to update the first correspondence relationship.

In one possible design, the channel state information includes one or a combination of the following: a received power of reference signals, a received strength of pilot signals, and a signal-to-noise ratio.

In one possible design, the uplink transmission resources include one or a combination of the following: time domain resources, frequency domain resources, and code domain resources.

In a second aspect, the embodiments of the present application provide a resource allocation method, including: determining, by a network device, a first correspondence relationship, where the first correspondence relationship comprises a correspondence relationship between a value range of channel state information and a grade corresponding to a terminal device; determining, by the network device, a second correspondence relationship, where the second correspondence relationship comprises a correspondence relationship between the grade corresponding to the terminal device and a set of uplink transmission resources; and broadcasting, by the network device, the first correspondence relationship and the second correspondence relationship to the terminal device, and the first correspondence relationship and the second correspondence relationship are used for the terminal device to select an uplink transmission resource.

In one possible design, the higher the grade corresponding to the terminal device in the second correspondence relationship, the better a quality of the uplink transmission resources included in the set of the uplink transmission resources corresponding to the grade.

In one possible design, the method further comprises: receiving, by the network device, channel state information from at least one terminal device; updating, by the network device, the first correspondence relationship based on the channel state information of the at least one terminal device;

and broadcasting, by the network device, an updated first correspondence relationship to the terminal device.

In one possible design, the network device updating the first correspondence relationship based on the received channel state information of the at least one terminal device, includes:

determining, by the network device, according to the channel state information of the at least one terminal device and the first correspondence relationship, a grade corresponding to each of the at least one terminal device; for any grade, determining, by the network device, adjustment information corresponding to the any grade according to channel state information of a terminal device corresponding to the any grade, and updates a value range of the channel state information corresponding to the any grade in the first correspondence relationship according to the adjustment information corresponding to the any grade; where the adjustment information includes one piece or a combination of following information: a reception overload rate, a transmission overload rate, and an effective overload rate.

In one possible design, the network device updating the value range of the channel state information corresponding to the any grade in the first correspondence relationship according to the adjustment information corresponding to the any grade includes:

when the adjustment information includes the reception overload rate and/or the effective overload rate, for a same grade, if the adjustment information corresponding to the same grade is less than a first threshold, narrowing, by the network device, the value range of the channel state information corresponding to the same grade in the first correspondence relationship; if the adjustment information is greater than a second threshold, expanding, by the network device, the value range of the channel state information corresponding to the same grade in the first correspondence relationship, where the first threshold is less than or equal to the second threshold; or when the adjustment information includes the transmission overload rate, for a same grade, if the transmission overload rate is greater than a third threshold, narrowing, by the network device, the value range of the channel state information corresponding to the same grade in the first correspondence relationship; and if the transmission overload rate is less than a fourth threshold, expanding, by the network device, the value range of the channel state information corresponding to the same grade in the first correspondence relationship, and the third threshold is greater than or equal to the fourth threshold.

In one possible design, the channel state information includes one or a combination of the following: a received power of reference signals, a received strength of pilot signals, and a signal-to-noise ratio.

In one possible design, the uplink transmission resources include one or a combination of the following: time domain resources, frequency domain resources, and code domain resources.

In a third aspect, the embodiments of the present application provide a terminal device, each including:

a transceiving device, configured to receive a first correspondence relationship and a second correspondence relationship broadcast by a network device, where the first correspondence relationship comprises a correspondence relationship between a value range of channel state information and a grade corresponding to the terminal device, and the second correspondence relationship comprises a correspondence relationship between the grade corresponding to the terminal device and a set of the uplink transmission resources; and a processing device, configured to determine a value of the channel state information of the terminal device and determine the grade corresponding to the terminal device according to the value of the channel state information and the first correspondence relationship received by the transceiving device, determine a set of uplink transmission resources corresponding to the grade which corresponds to the terminal device according to the grade corresponding to the terminal device and the second correspondence relationship received by the transceiving device, and select an uplink transmission resource from the determined set of the uplink transmission resources.

In one possible design, the higher the grade corresponding to the terminal device in the second correspondence relationship, the better a quality of the uplink transmission resources included in the set of the uplink transmission resources corresponding to the grade.

In one possible design, the transceiving device is further configured to receive an updated first correspondence relationship broadcast by the network device; and the processing device is further configured to:

after the transceiving device receives the updated first correspondence relationship broadcast by the network device, determine the grade corresponding to the terminal device according to the value of the channel state information of the terminal device and the updated first correspondence relationship.

In one possible design, the transceiving device is further configured to:

report the value of the channel state information of the terminal device to the network device, and the reported value of the channel state information is used for the network device to update the first correspondence relationship.

In one possible design, the channel state information includes one or a combination of the following: a received power of reference signals, a received strength of pilot signals, and a signal-to-noise ratio.

In one possible design, the uplink transmission resources include one or a combination of the following: time domain resources, frequency domain resources, and code domain resources.

In a fourth aspect, the embodiments of the present application provide a network device, including:

a processing device, configured to determine a first correspondence relationship, where the first correspondence relationship comprises a correspondence relationship between a value range of channel state information and a grade corresponding to a terminal device; and determine a second correspondence relationship, where the second correspondence relationship comprises a correspondence relationship between the grade corresponding to the terminal device and a set of the uplink transmission resources; and a transceiving device, configured to broadcast the first correspondence relationship and the second correspondence relationship determined by the processing device to the terminal device, where the first correspondence relationship and the second correspondence relationship are used for the terminal device to select an uplink transmission resource.

In one possible design, the higher the grade corresponding to the terminal device in the second correspondence relationship, the better a quality of the uplink transmission resources included in the set of the uplink transmission resources corresponding to the grade.

In one possible design, the transceiving device is further configured to receive channel state information from at least one terminal device;

the processing device is further configured to: update the first correspondence relationship based on the channel state information of the at least one terminal device after the transceiving device receives the channel state information from the at least one terminal device; and the transceiving device is further configured to: broadcast an updated first correspondence relationship to the terminal device.

In one possible design, when updating the first correspondence relationship based on the received channel state information of the at least one terminal device, the processing device is configured to: according to the channel state information of the at least one terminal device and the first correspondence relationship, determine a grade corresponding to each of the at least one terminal device; and for any grade, determine adjustment information corresponding to the any grade according to channel state information of a terminal device corresponding to the any grade, and update the value range of the channel state information corresponding to the any grade in the first correspondence relationship according to the adjustment information corresponding to the any grade; where the adjustment information includes one piece or a combination of following information: a reception overload rate, a transmission overload rate, and an effective overload rate.

In one possible design, hen updating the value range of the channel state information corresponding to the any grade in the first correspondence relationship according to the adjustment information corresponding to the any grade, the processing device is configured to:

when the adjustment information includes the reception overload rate and/or the effective overload rate, for a same grade, if the adjustment information corresponding to the same grade is less than a first threshold, narrow the value range of the channel state information corresponding to the same grade in the first correspondence relationship; if the adjustment information is greater than a second threshold, expand the value range of the channel state information corresponding to the same grade in the first correspondence relationship, and the first threshold is less than or equal to the second threshold; or when the adjustment information includes the transmission overload rate, for a same grade, if the transmission overload rate is greater than a third threshold, narrow the value range of the channel state information corresponding to the same grade in the first correspondence relationship; and if the transmission overload rate is less than a fourth threshold, expand the value range of the channel state information corresponding to the same grade in the first correspondence relationship, and the third threshold is greater than or equal to the fourth threshold.

In one possible design, the channel state information includes one or a combination of the following: a received power of reference signals, a received strength of pilot signals, and a signal-to-noise ratio.

In one possible design, the uplink transmission resources include one or a combination of the following: time domain resources, frequency domain resources, and code domain resources.

In a fifth aspect, the embodiments of the present application provide a terminal device, including a processor and a memory, where:

the processor is configured to read a program in the memory and execute following procedures:

controlling a transceiver to receive a first correspondence relationship and a second correspondence relationship broadcast by the network device, where the first correspondence relationship comprises a correspondence relationship between a value range of channel state information and a grade corresponding to the terminal device, and the second correspondence relationship comprises a correspondence relationship between the grade corresponding to the terminal device and a set of uplink transmission resources;

determining a value of channel state information of the terminal device and determining the grade corresponding to the terminal device according to the value of channel state information of the terminal device and the first correspondence relationship received by the transceiver; and determining a set of the uplink transmission resources corresponding to the terminal device according to the grade corresponding to the terminal device and the second correspondence relationship received by the transceiver, and selecting an uplink transmission resource from the determined set of the uplink transmission resources.

In a sixth aspect, the embodiments of the present application provide a network device, including a processor and a memory, where the processor is configured to read a program in the memory and execute following procedures:

determining a first correspondence relationship, where the first correspondence relationship comprises a correspondence relationship between a value range of channel state information and a grade corresponding to a terminal device;

determining a second correspondence relationship, where the second correspondence relationship comprises a correspondence relationship between the grade corresponding to the terminal device and a set of uplink transmission resources; and controlling the transceiver to broadcast the first correspondence relationship and the second correspondence relationship to the terminal device, and the first correspondence relationship and the second correspondence relationship are used for the terminal device to select an uplink transmission resource.

In the embodiments of the application, since the network device does not need to interact with each terminal device for many times in the resource allocation process, the implementation difficulty of allocating the uplink transmission resources to the terminal devices is reduced, and the time consumption and signaling overhead for allocating the uplink transmission resources to the terminal devices are reduced. In addition, since the values of the channel state information of the plurality of terminal devices corresponding to the same set of the uplink transmission resources are within a value range, that is, the values of the channel state information of the plurality of terminal devices are similar, based on the principle of serial interference cancellation, even if the plurality of terminal devices select the same uplink transmission resource in one set of the uplink transmission resources, the network device can also accurately demodulate messages transmitted by the plurality of terminal devices using the same uplink transmission resource, the problems of low transmission efficiency and even transmission failure of the terminal devices due to multiple terminal devices selecting the same uplink transmission resource are avoided, and the transmission efficiency of the terminal devices is improved.

DETAILED DESCRIPTION OF THE EMBODIMENTS

Figure 1:
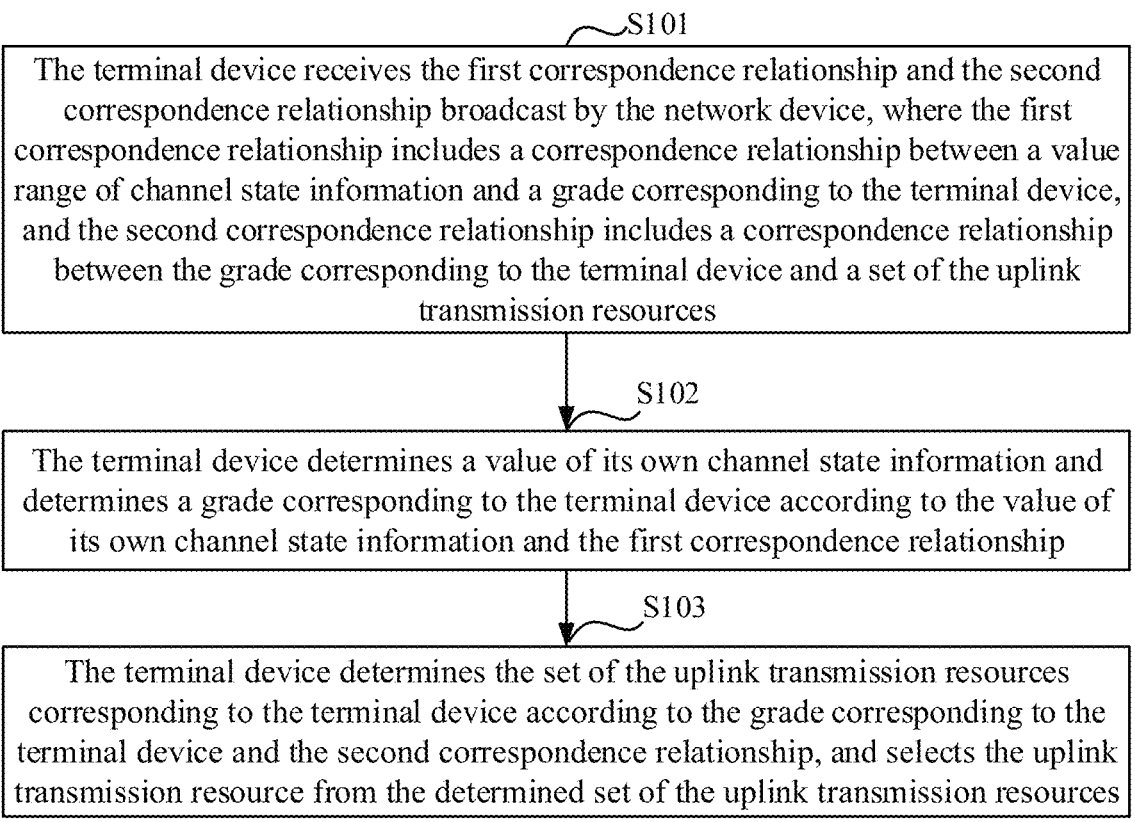
FIG. 1 is a flow schematic chart of a resource allocation method provided by the embodiments of the application.

In the embodiments of the application will be described clearly and completely with reference to the drawings in the embodiments of the application.

The embodiments of the application provide a resource allocation method and device, which are used for allocating uplink transmission resources to terminal devices, in particular to terminal devices in a 5G system. In the embodiments of the application, the terminal device can determine a set of uplink transmission resources matched therewith according to its own channel state information and a received first correspondence relationship and second correspondence relationship broadcast by a network device, and select the uplink transmission resources from the set, thus realizing the allocation of the uplink transmission resources to the terminal device. Since the network device does not need to interact with each terminal device for many times in the resource allocation process, the implementation difficulty of allocating the uplink transmission resources to the terminal devices is reduced, and the time consumption and signaling overhead for allocating the uplink transmission resources to the terminal devices are reduced. In addition, since the values of channel state information of the plurality of terminal devices matched with the same set of the uplink transmission resources are within a value range, the problems of low transmission efficiency and even transmission failure of the terminal devices due to the plurality of terminal devices selecting the same uplink transmission resource are avoided, and the transmission efficiency of the terminal devices is improved. The method and device are based on the same application conception. Since the principles of solving problems are similar, the implementation of the device and the implementation of the method can refer to each other, and repeated parts will not be mentioned here.

The embodiments of the application is applicable to various systems, especially the 5G system. For example, the suitable systems may be a global system of mobile communication (GSM), a code division multiple access (CDMA) system, a wideband code division multiple access (WCDMA) general packet radio service (GPRS) system, a long term evolution (LTE) system, an LTE frequency division duplex (FDD) system, LTE time division duplex (TDD) system, a universal mobile telecommunication system (UMTS), a worldwide interoperability for microwave access (WiMAX) system, the 5G system, a 5G New Radio (NR) system and the like. All these systems include terminal devices and network devices.

The terminal devices referred to in the embodiments of the present application may be devices providing voice and/or data connectivity to a user, a handheld device having a wireless connection function, or other processing devices connected to a wireless modem. The names of the terminal devices may vary with different systems. For example, in the 5G system, the terminal devices may be called user equipment (UE). Wireless terminal devices may communicate with one or more core networks via Radio Access Network (RAN). The wireless terminal devices may be mobile terminal devices, such as mobile phones (or referred to as a "cellular" phones) and computers with the mobile terminal devices, for example, may be portable, pocket-sized, handheld, computer-built or vehicle-mounted mobile devices which exchanges language and/or data with a wireless access network, such as personal communication service (PCS) phones, cordless phones, session initiated protocol (SIP) phones, wireless local loop (WLL) stations, personal digital assistant (PDA) and other devices. The wireless terminal devices may also be referred to as a system, a subscriber device, a subscriber station, a mobile station, a mobile, a remote station, an access point, a remote terminal, an access terminal, a user terminal, a user agent, and a user device, which is not limited by the embodiments of the application.

The network device involved in the embodiments of the application may be a base station, which may comprise a plurality of cells. Depending on specific different applications, the base station may also be called an access point, or may refer to a device which communicates with the wireless terminal devices through one or more sectors on an air interface in an access network, or other names. The network device may be used for mutual conversion of received air frames and an internet protocol (IP) packets as a router between the wireless terminal devices and the rest of the access network, where the rest of the access network may include an IP communication network. The network device may also coordinate attribute management of the air interface. For example, the network device involved in the embodiments of the present application may be a base transceiver station (BTS) in the global system for mobile communications (GSM) or code division multiple access (CDMA), may also be a NodeB in the wide-band code division multiple access (WCDMA) or an evolutional node B (eNB or e-NodeB) in the long term evolution (LTE) system, a 5G base station in the 5G network architecture (next generation system), may also be a home evolved node B (HeNB), a relay node, a femto, a pico, etc., which are not limited in the embodiments of the present application.

The embodiments of the present application will be described in detail below with reference to the drawings in the specification. It should be noted that the display order of the embodiments of this application only represents the order of the embodiments, and does not represent the priorities provided by the embodiments.

As shown in FIG. 1, the embodiments of the present application provide a resource allocation method, and the method includes the following operations.

S101: the terminal device receives the first correspondence relationship and the second correspondence relationship broadcast by the network device, where the first correspondence relationship includes a correspondence relationship between a value range of channel state information and a grade corresponding to the terminal device, and the second correspondence relationship includes a correspondence relationship between the grade corresponding to the terminal device and a set of the uplink transmission resources.

In the present embodiment, the channel state information of the terminal device includes but is not limited to: the received power of reference signals, the received strength of pilot signals, and the signal-to-noise ratio and the like.

The uplink transmission resources include but are not limited to time domain resources, frequency domain resources, and code domain resources and the like. The time domain resources may be time slots, etc., the frequency domain resources may be frequency, frequency sub-bands, etc., and the code domain resources may be code words with unequal diversity orders, etc.

In operation S101, the terminal device receives messages broadcast by the network device and obtains the first correspondence relationship and the second correspondence relationship carried in the received messages, where the messages broadcast by the network device may be system messages or other messages. The first correspondence relationship and the second correspondence relationship may be carried in one message broadcast by the network device, or may be carried in the different messages broadcast by the network device respectively.

In one embodiment, the network device may determine the initial first correspondence relationship according to the channel state information of the terminal device acquired by itself before operation S101, or pre-configure the initial first correspondence relationship before operation S101. Further, after determining the initial first correspondence relationship, or after pre-configuring the initial first correspondence relationship, the network device may periodically update the first correspondence relationship.

S102: the terminal device determines a value of its own channel state information and determines a grade corresponding to the terminal device according to the value of its own channel state information and the first correspondence relationship.

In operation S102, the terminal device can determine a channel state information value range where the value of the channel state information of the terminal device is located by matching the value of the channel state information of the terminal device with the value range of the channel state information in the first correspondence relationship, to determine the grade corresponding to the terminal device which corresponds to the value range as the grade determined for the terminal device.

For example, the channel state information of the terminal device includes the received power of the reference signals, assuming that the received power of the terminal device has a value of 4 dB, the first correspondence relationship is the correspondence relationship between the value range of the received power of the terminal device and the grade corresponding to the terminal device, as shown in Table 1 below.

TABLE 1

Correspondence Relationship between Value Range of Received Power of Reference Signals and Grade corresponding to Terminal Device

| grade corresponding to terminal device | value range of received power (dB) of reference signals |
|---|---|
| first grade | 1 to 3 |
| second grade | 4 to 5 |
| third grade | 6 to 7 |
| fourth grade | 8 to 9 |

The terminal device matches the value 4 dB of received power of reference signals with the value range of the received power of the terminal device in the first correspondence relationship in Table 1. The value 4 dB of the received power of the reference signals of the terminal device corresponds to the value range of 4 to 5 dB, and the grade corresponding to the terminal device which corresponds to the value range is the second grade, so the grade corresponding to the terminal device is the second grade.

Before operation S102, the terminal device acquires the channel state information of the terminal device. For example, in the case where the channel state information of the terminal device includes the received power of the reference signals, the terminal device may determine the received power of reference signals of its own.

S103: the terminal device determines the set of the uplink transmission resources corresponding to the terminal device according to the grade corresponding to the terminal device and the second correspondence relationship, and selects the uplink transmission resource from the determined set of the uplink transmission resources.

The higher the grades corresponding to the terminal device in the second correspondence relationship, the better the quality of the uplink transmission resources included in the set of the uplink transmission resources corresponding thereto. For example, the higher the grade corresponding to the terminal device in the second correspondence relationship, the lower the interference over thermal (Iot) of the uplink transmission resources included in the set of the uplink transmission resources corresponding thereto, and the better the quality of the uplink transmission resources.

When the values of the received power of the plurality of terminal devices are similar, for example, the values of the received power of the plurality of terminal devices are all 3 to 5 dB, even if these terminal devices use the same transmission resource for uplink transmission, the network device can also accurately demodulate the uplink transmission messages of these terminal devices, and this principle is called a serial interference cancellation principle.

Based on the above-mentioned serial interference cancellation principle, in operation S103, the terminal device matches its own corresponding grade with the set of the uplink transmission resources in the second correspondence relationship, determines the set of the uplink transmission resources matched with the grade corresponding to the terminal device, and randomly selects the uplink transmission resources from the set of the uplink transmission resources. Since the values of the channel state information of the plurality of terminal devices corresponding to the same set of the uplink transmission resources are within one value range, that is, the values of the channel state information of the plurality of terminal devices are similar, based on the serial interference elimination principle, even if the plurality of terminal devices select the same uplink transmission resource in the one set of the uplink transmission resources, the network device can also accurately demodulate messages transmitted by the plurality of terminal devices using the same uplink transmission resource, to avoid the problems of low transmission efficiency and even transmission failure of the terminal device due to resource collision and improving the transmission efficiency of the terminal device.

In one embodiment, the terminal device may determine a transmitting power range of the terminal device corresponding to the grade which corresponds to the terminal device according to the grade corresponding to the terminal device and a preset correspondence relationship between the grade corresponding to the terminal device and the transmitting power range of the terminal device, and select the transmitting power used for uplink transmission from the determined transmitting power range of the terminal device.

In one embodiment, the terminal device may determine the priority of the terminal device according to preset conditions before operation S103. In operation S103, the terminal device may select the resources mapped by the priority of the terminal device in the determined set of the uplink transmission resources according to its own priority and a preset mapping relationship between the priority and the resources. For example, the terminal device determines its own priority according to its own quality of service (Qos) grade, and selects the resources mapped by the priority of the terminal device in the determined set of the uplink transmission resources according to its own priority and the preset mapping relationship between the priority and the resources, to provide the different resources for the terminal devices with different Qos grades, improve the transmission efficiency of the terminal device, and improve the utilization rate of the resources.

In one embodiment, the terminal device reports the value of the channel state information of the terminal device to the network device by adopting the selected uplink transmission resources, and the reported value of the channel state information is used for the network device to update the first correspondence relationship. After receiving the channel state information reported by the terminal device, the network device updates the first correspondence relationship according to the channel state information reported by the terminal device, and broadcasts an updated first correspondence relationship to the terminal device. In this way, by updating and adjusting the first correspondence relationship through the network device, the terminal device can select the uplink transmission resources which are more in line with the requirements of its own uplink transmission, to improve the transmission efficiency of the terminal device, and reducing the waste of uplink transmission resources.

In one embodiment, the terminal device receives the updated first correspondence relationship broadcast by the network device, and determine its own corresponding grade according to the values of its own channel state information and the updated first correspondence relationship, so that the terminal device can select the uplink transmission resources which are more in line with the requirements of its own uplink transmission, to improve the transmission efficiency of the terminal device and reducing the waste of uplink transmission resources.

In the resource allocation method provided by the embodiments of the present application, the terminal device determines the grade corresponding to the terminal device according to the value of its own channel state information and the received first correspondence relationship broadcast by the network device, where the first correspondence relationship is the correspondence relationship between the value range of the channel state information and the grade corresponding to the terminal device; and then determines the set of the uplink transmission resources corresponding to the corresponding grade of the terminal device according to the corresponding grade of the terminal device and the second correspondence relationship, where the second correspondence relationship is the correspondence relationship between the corresponding grade of the terminal device and the set of the uplink transmission resources, so that the terminal device can select the uplink transmission resources in the set of the uplink transmission resources, thus realizing the allocation of the uplink transmission resources for the terminal device, reducing the implementation difficulty of allocating the uplink transmission resources for the terminal devices in the 5G system, and reducing the time consumption and signaling overhead of allocating the uplink transmission resources for the terminal devices in the 5G system. In addition, since the values of the channel state information of the plurality of terminal devices corresponding to the same set of the uplink transmission resources are within one value range, the problems of low transmission efficiency and even transmission failure of the terminal devices due to the plurality of terminal devices selecting the same uplink transmission resource are further avoided, and the transmission efficiency of the terminal devices is improved.

Figure 2:
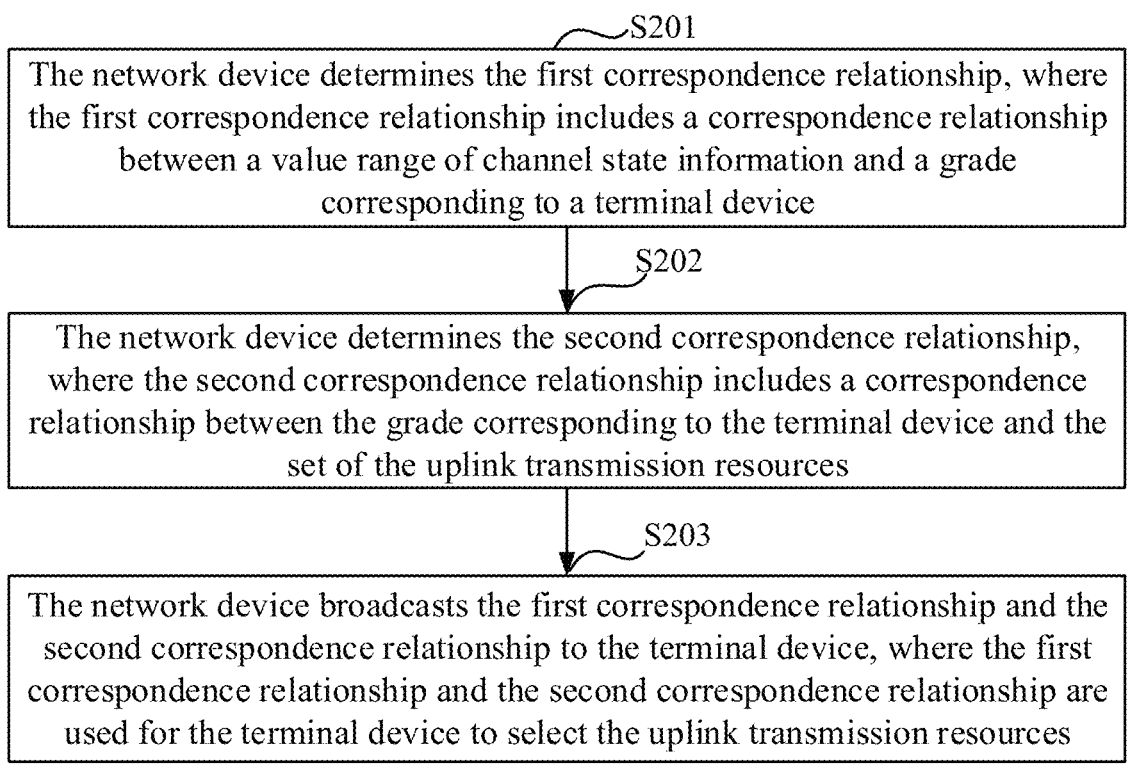
FIG. 2 is a flow schematic chart of another resource allocation method provided by the embodiments of the application.

As shown in FIG. 2, the embodiments of the present application provide a resource allocation method, and the method includes the following operations.

S201: the network device determines the first correspondence relationship, where the first correspondence relationship includes a correspondence relationship between a value range of channel state information and a grade corresponding to a terminal device.

In operation S201, the network device may determine an initial first correspondence relationship according to the acquired channel state information of the terminal device, or pre-configure the initial first correspondence relationship; after determining the initial first correspondence relationship, or after pre-configuring the initial first correspondence relationship, the network device can determine adjustment information, the network device updates the first correspondence relationship based on the channel state information of at least one terminal device, and broadcasts an updated first correspondence relationship to the terminal devices, so that the network device can configure the terminal devices with different channel states with the uplink transmission resources which better meet the requirements of uplink transmission of these terminal devices, to improve the transmission efficiency of the terminal devices and reducing the waste of the uplink transmission resources. It should be noted that the network device may periodically update the first correspondence relationship, or update the first correspondence relationship after the terminal device reports the channel state information of the terminal device, which is not limited in this embodiment. The first correspondence relationship herein is similar to the first correspondence relationship described in the embodiment at the terminal device side, and will not be repeated here.

The channel state information of the terminal device includes but is not limited to: the received power of reference signals, the received strength of pilot signals, and the signal-to-noise ratio and the like.

In one embodiment, in operation S201, before updating the first correspondence relationship based on the channel state information of the at least one terminal device, the network device receives the channel state information of the at least one terminal device, reported by the at least one terminal device.

In one embodiment, according to the channel state information of the at least one terminal device and the first correspondence relationship, the network device determines the grade corresponding to each of the at least one terminal device; and for any grade, the network device determines the adjustment information corresponding to the grade according to the channel state information of the terminal device corresponding to the grade, and updates the value range of the channel state information corresponding to the grade in the first correspondence relationship according to the adjustment information corresponding to the grade, where the adjustment information of each grade includes one piece or a combination of the following information: a reception overload rate, a transmission overload rate, and an effective overload rate. The reception overload rate is the ratio of the number of the demodulated terminal devices which use the uplink transmission resources of the network device to send messages to the network device to the maximum number of the terminal devices that the uplink transmission resources of the network device can support; the effective overload rate is the weighted average of the reception overload rates; and the transmission overload rate is the ratio of the number of the terminal devices which use the uplink transmission resources of the network device to send the messages to the network device to the maximum number of the terminal devices that the uplink transmission resources of the network device can support.

In one embodiment, the network device may update the value range of the channel state information corresponding to the grade in the first correspondence relationship according to the adjustment information corresponding to the grade in one of the following ways.

First way: when the adjustment information includes the reception overload rate and/or the effective overload rate, for the same grade, if the adjustment information is less than a preset first threshold, it means that the number of the terminal devices in this grade, which use the uplink transmission resources of the network device to send messages to the network device and the messages sent by which are demodulated is relatively small, the transmission quality of the terminal devices in this grade cannot meet the requirements of practical application, and then the network device narrows the value range of the channel state information corresponding to the grade in the first correspondence relationship, to reduce the number of the terminal devices using the uplink transmission resources corresponding to the grade for transmission and improve the transmission efficiency of the terminal devices in this grade.

When the adjustment information includes the reception overload rate and/or the effective overload rate, for the same grade, if the adjustment information is greater than or equal to a preset second threshold, it means that the transmission quality of the terminal devices in this grade meets the requirements of practical application, and then the network device can expand the value range of the channel state information corresponding to the grade in the first correspondence relationship, to improve the utilization rate of the uplink transmission resources and reduce the waste of the uplink transmission resources. Or if the adjustment information is greater than or equal to the preset second threshold, the network device can also keep the value range of the channel state information corresponding to the grade in the first correspondence relationship unchanged.

The first threshold is less than or equal to the second threshold. It should be noted that in addition to using the first threshold and the second threshold to implement the first way, one or more thresholds may be used to implement the first way, which is not limited in this embodiment.

Second way: when the adjustment information includes the transmission overload rate, for the same grade, if the transmission overload rate is greater than a preset third threshold, it indicates that the number of the terminal devices which use the uplink transmission resources of the network device to send the messages to the network device in this grade is relatively large, which may lead to the transmission quality of the terminal devices in this grade not meeting the requirements of practical application, and then the network device narrows the value range of the channel state information corresponding to the grade in the first correspondence relationship, to reduce the number of the terminal devices which use the uplink transmission resources corresponding to the grade for transmission, and improve the transmission efficiency of the terminal devices in this grade.

When the adjustment information includes the transmission overload rate, for the same grade, if the transmission overload rate included in the adjustment information is less than or equal to a preset fourth threshold, it indicates that the transmission quality of the terminal devices in the grade meets the requirements of practical application, and then the network equipment expands the value range of the channel state information corresponding to the grade in the first correspondence relationship, to improve the utilization rate of uplink transmission resources and reduce the waste of the uplink transmission resources; or if the adjustment information is less than or equal to the preset third threshold, the network device can keep the value range of the channel state information corresponding to the grade in the first correspondence relationship unchanged. The third threshold is greater than or equal to a fourth threshold. It should be noted that in addition to using the third threshold and the fourth threshold to implement the second way, one or more thresholds may be used to implement the second way, which is not limited in this embodiment.

It should be noted that in addition to the above two ways, other ways may be used to adjust the value range of the channel state information corresponding to the grade in the first correspondence relationship according to the requirements of practical application.

S202: the network device determines the second correspondence relationship, where the second correspondence relationship includes a correspondence relationship between the grade corresponding to the terminal device and the set of the uplink transmission resources.

Here, the higher the grade corresponding to the terminal device in the second correspondence relationship, the better the quality of the uplink transmission resources included in the set of the uplink transmission resources corresponding thereto.

In operation S202, the network device may determine the second correspondence relationship according to the channel state information of the terminal devices acquired by itself, or pre-configure the second correspondence relationship. It should be noted that the second correspondence relationship here is similar to the second correspondence relationship described in the embodiment on the terminal device side, and will not be repeated here.

In this embodiment, operation S201 can be executed before or after operation S202, and operation S201 can also be executed together with operation S202. In this embodiment, the sequence of executing operations S201 and S202 is not limited.

S203: the network device broadcasts the first correspondence relationship and the second correspondence relationship to the terminal device, where the first correspondence relationship and the second correspondence relationship are used for the terminal device to select the uplink transmission resources.

In operation S203, the network device may broadcast messages carrying the first correspondence relationship and the second correspondence relationship to the terminal device, where the messages broadcast by the network device to the terminal device may be system messages or other messages. The first correspondence relationship and the second correspondence relationship may be carried in one message broadcast by the network device to the terminal device, or may be respectively carried in the different messages broadcast by the network device to the terminal device, which is not limited in this embodiment.

In one embodiment, the network device may broadcast the messages carrying the correspondence relationship between the grade corresponding to the terminal device and the transmission power range of the terminal device to the terminal device.

In the resource allocation method provided by the embodiments of the application, the network device determines and broadcasts the first correspondence relationship and the second correspondence relationship to the terminal device, where the first correspondence relationship is the correspondence relationship between the value range of the channel state information and the grade corresponding to the terminal device, the second correspondence relationship is the correspondence relationship between the grade corresponding to the terminal device and the set of the uplink transmission resources, so that the terminal device first determines the set of the uplink transmission resources matched with the terminal device according to the value of the channel state information of the terminal device and the received first correspondence relationship and second correspondence relationship broadcast by the network device to the terminal device, and selects the uplink transmission resource from the set of the uplink transmission resources, thus realizing the allocation of the uplink transmission resources for the terminal device, reducing the implementation difficulty of allocating the uplink transmission resources for the terminal device in the 5G system, and reducing the time consumption and signaling overhead of allocating the uplink transmission resources for the terminal device in the 5G system. In addition, since the values of the channel state information of the plurality of terminal devices corresponding to the same set of the uplink transmission resources are within one value range, the problems of low transmission efficiency and even transmission failure of the terminal devices due to the plurality of terminal devices selecting the same uplink transmission resource are avoided, and the transmission efficiency of the terminal devices is improved.

Figure 3:
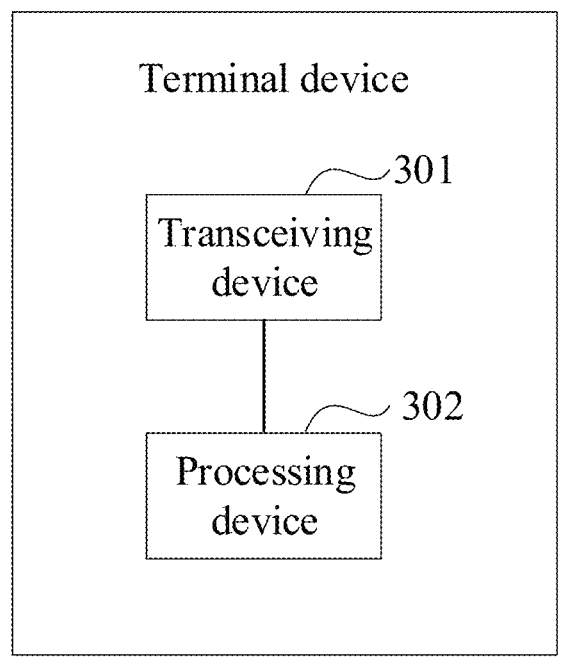
FIG. 3 is a structural schematic diagram of a terminal device provided by the embodiments of the application.

Based on the above embodiments, the embodiments of the present application provide a terminal device, which can adopt the method provided in the corresponding embodiment of FIG. 1. Referring to FIG. 3, the terminal device includes a transceiving device 301 and a processing device 302.

The transceiving device 301 is configured to receive the first correspondence relationship and the second correspondence relationship broadcast by the network device to the terminal device, where the first correspondence relationship includes the correspondence relationship between the value range of the channel state information and the grade corresponding to the terminal device, and the second correspondence relationship includes the correspondence relationship between the grade corresponding to the terminal device and the set of the uplink transmission resources.

The processing device 302 is configured to determine a value of channel state information of the terminal device and determine a grade corresponding the terminal device according to the value of channel state information and the first correspondence relationship received by the transceiving device 301, determine the set of the uplink transmission resources corresponding to the grade which corresponds to the terminal device according to the grade corresponding to the terminal device and the second correspondence relationship received by the transceiving devices 301, and select the uplink transmission resources from the determined set of the uplink transmission resources.

In one embodiment, the higher the grade corresponding to the terminal device in the second correspondence relationship, the better the quality of the uplink transmission resources included in the set of the uplink transmission resources corresponding thereto.

In one embodiment, the transceiving device 301 is further configured to receive an updated first correspondence relationship broadcast by the network device.

The processing device 302 is further configured to, after the transceiving device 301 receives the updated first correspondence relationship broadcast by the network device, determine a grade corresponding to the terminal device according to the value of channel state information of the terminal device and the updated first correspondence relationship.

In one embodiment, the transceiving device 301 is further configured to report the value of channel state information of the terminal device to the network device, where the reported value of the channel state information is used for the network device to update the first correspondence relationship.

In one embodiment, the channel state information includes one or a combination of the following: the received power of reference signals, the received strength of pilot signals, and the signal-to-noise ratio.

In one embodiment, the uplink transmission resources include one or a combination of the following: time domain resources, frequency domain resources, and code domain resources.

It should be noted that the division of the devices in the embodiments of the present application is schematic and is only logic function division, and there may be other division modes in actual implementation. In addition, all the functional devices in each embodiment of the present application may be integrated into one processing device, or exist physically separately, or the two or more devices may be integrated into one device. The above integrated devices can be implemented in the form of hardware or software functional devices.

If the integrated devices are implemented in the form of the software functional devices and sold or used as independent products, they may be stored in a computer readable storage medium. Based on this understanding, the embodiments of the disclosure can be embodied in the form of a software product, the computer software product is stored in a storage medium and includes a number of instructions to cause a computer device (which may be a personal computer, a server, or a network device, etc.) or a processor to perform all or part of the operations of the methods described in all the embodiments of the present application. The aforementioned storage medium includes: a USB flash disk, a removable hard disk, a read-only memory (ROM), a random access memory (RAM), a magnetic disk or an optical disk and other media which can store program codes.

Figure 4:
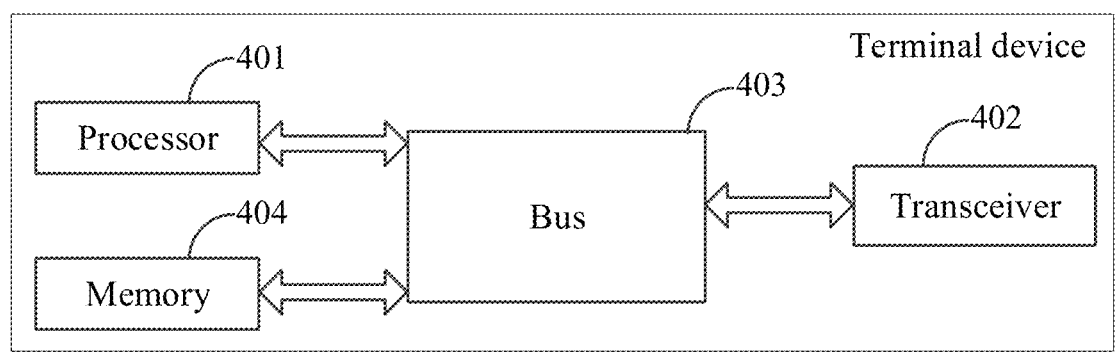
FIG. 4 is a structural schematic diagram of another terminal device provided by the embodiments of the application.

Based on the above embodiment, the embodiments of the present application also provide a terminal device, which can adopt the method provided in the embodiment corresponding to FIG. 1 and can be the same as the terminal device shown in FIG. 3. Referring to FIG. 4, the terminal device includes a processor 401, a transceiver 402, a bus 403 and a memory 404, where:

the processor 401 is configured to read programs in the memory 404 and execute the following procedures:

the processor 401 is configured to control the transceiver 402 to receive the first correspondence relationship and the second correspondence relationship broadcast by the network device, where the first correspondence relationship includes the correspondence relationship between the value range of the channel state information and the grade corresponding to the terminal device, and the second correspondence relationship includes the correspondence relationship between the grade corresponding to the terminal device and the set of the uplink transmission resources;

the processor 401 is further configured to determine a values of channel state information of the terminal device and determine a grade corresponding to the terminal device according to the value of channel state information and the first correspondence relationship received by the transceiver 402, determine the set of the uplink transmission resources corresponding to the grade which corresponds to the terminal device according to the grade corresponding to the terminal device and the second correspondence relationship received by the transceiver 402, and select the uplink transmission resource from the determined set of the uplink transmission resources;

the transceiver 402 is configured to receive and transmit data under the control of the processor 401.

In one embodiment, the higher the grade corresponding to the terminal device in the second correspondence relationship, the better the quality of the uplink transmission resources included in the set of the uplink transmission resources corresponding thereto.

In one embodiment, the processor 401 is further configured to: control the transceiver 402 to receive the updated first correspondence relationship broadcast by the network device, and determine a grade corresponding to the terminal device according to the value of the channel state information of the terminal and the updated first correspondence relationship.

In one embodiment, the processor 401 is further configured to: control the transceiver 402 to report the value of channel state information of the terminal device to the network device, where the reported value of the channel state information are used for the network device to update the first correspondence relationship.

In one embodiment, the channel state information includes one or a combination of the following: the received power of reference signals, the received strength of pilot signals, and the signal-to-noise ratio.

In one embodiment, the uplink transmission resources include one or a combination of the following: time domain resources, frequency domain resources, and code domain resources.

The processor 401, the transceiver 402, and the memory 404 are connected to one another via the bus 403. The bus 403 may be peripheral component interconnect (PCI) bus or extended industry standard architecture (EISA) bus and the like. The bus can be divided into address bus, data bus, and control bus, etc.

In FIG. 4, the bus architecture may include any number of interconnected buses and bridges, and particularly connects various circuits of one or more processors represented by the processor 401 and memories represented by the memory 404. The bus architecture can also link together various other circuits such as peripheral devices, voltage regulators, power management circuits, etc., which are well known in the art, and therefore will not be further described herein. Bus interfaces provide interfaces. The transceiver 402 may be a plurality of elements, including transmitters and transceivers, providing devices for communicating with various other devices over a transmission medium. The processor 401 is responsible for managing the bus architecture and normal processing, and the memory 404 can store data used by the processor 401 for operation.

In one embodiment, processor 401 may be a central processing device, an application specific integrated circuit (ASIC), a field-programmable gate array (FPGA), or a complex programmable logic device (CPLD).

Figure 5:
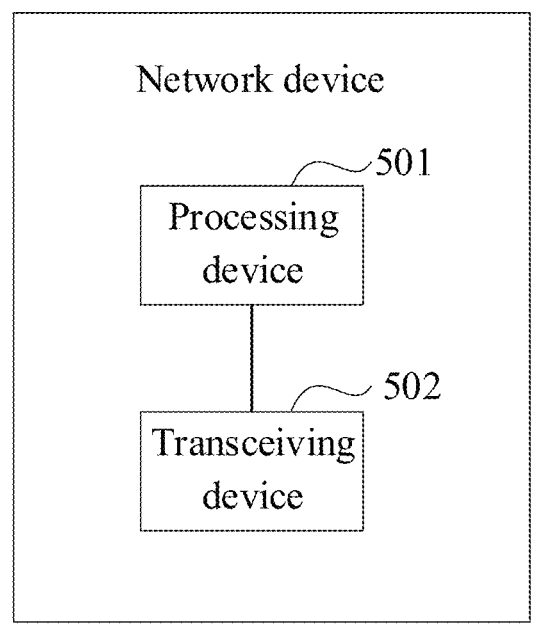
FIG. 5 is a structural schematic diagram of a network device provided by the embodiments of the application.

Based on the above embodiments, the embodiments of the present application provide a network device, which can adopt the method provided in the corresponding embodiment of FIG. 2. Referring to FIG. 5, the network device comprises a processing device 501 and a transceiving device 502.

The processing device 501 is configured to determine the first correspondence relationship, where the first correspondence relationship includes the correspondence relationship between the value range of the channel state information and the grade corresponding to the terminal device; and determine the second correspondence relationship, where the second correspondence relationship includes the correspondence relationship between the grade corresponding to the terminal device and the set of the uplink transmission resources; and the transceiving device 502 is configured to broadcast the first correspondence relationship and the second correspondence relationship determined by the processing device 501 to the terminal device, where the first correspondence relationship and the second correspondence relationship are used for the terminal device to select the uplink transmission resources.

In one embodiment, the higher the grade corresponding to the terminal device in the second correspondence relationship, the better the quality of the uplink transmission resources included in the set of the uplink transmission resources corresponding thereto.

In one embodiment, the transceiving device 502 is further configured to receive the channel state information from at least one terminal device;

the processing device 501 is further configured to update the first correspondence relationship based on the channel state information of the at least one terminal device after the transceiving device 502 receives the channel state information from the at least one terminal device; and the transceiving device 502 is further configured to broadcast the updated first correspondence relationship to the terminal device.

In one embodiment, when updating the first correspondence relationship based on the received channel state information of the at least one terminal device, the processing device 501 is configured to:

according to the channel state information of the at least one terminal device and the first correspondence relationship, determine a grade corresponding to each of the at least one terminal device;

for any grade, determine the adjustment information corresponding to the grade according to the channel state information of the terminal device corresponding to the grade, and update the value range of the channel state information corresponding to the grade in the first correspondence relationship according to the adjustment information corresponding to the grade;

where the adjustment information of each grade includes one piece or a combination of the following information: a reception overload rate, a transmission overload rate, and an effective overload rate.

In one embodiment, when updating the value range of the channel state information corresponding to the grade in the first correspondence relationship according to the adjustment information corresponding to the grade, the processing device 501 is configured to:

when the adjustment information includes the reception overload rate and/or the effective overload rate, for the same grade, if the adjustment information corresponding to the grade is less than a first threshold, narrow the value range of the channel state information corresponding to the grade in the first correspondence relationship; if the adjustment information is greater than a second threshold, expand the value range of the channel state information corresponding to the grade in the first correspondence relationship, where the first threshold is less than or equal to the second threshold; or when the adjustment information includes the transmission overload rate, for the same grade, if the transmission overload rate is greater than a third threshold, narrow the value range of the channel state information corresponding to the grade in the first correspondence relationship; and if the transmission overload rate is less than a fourth threshold, expand the value range of the channel state information corresponding to the grade in the first correspondence relationship, where the third threshold is greater than or equal to the fourth threshold.

In one embodiment, the channel state information includes one or a combination of the following: the received power of reference signals, the received strength of pilot signals, and the signal-to-noise ratio.

In one embodiment, the uplink transmission resources include one or a combination of the following: time domain resources, frequency domain resources, and code domain resources.

It should be noted that the division of devices in the embodiments of the present application is schematic and is only logic function division, and there may be other division modes in actual implementation. In addition, all the functional devices in each embodiment of the present application may be integrated into one processing device, or exist physically separately, or two or more devices may be integrated into one device. The above integrated devices can be implemented in the form of hardware or software functional devices.

If the integrated devices are implemented in the form of the software functional devices and sold or used as independent products, they may be stored in a computer readable storage medium. Based on this understanding, the embodiments of the present application in essence, or the part contributing to the prior art, or all or part of the embodiments can be embodied in the form of a software product, the computer software product is stored in a storage medium and includes a number of instructions to cause a computer device (which may be a personal computer, a server, or a network device, etc.) or a processor to perform all or part of the operations of the methods described in all the embodiments of the present application. The aforementioned storage medium includes: a USB flash disk, a removable hard disk, an ROM, an RAM, a magnetic disk or an optical disk and other media which can store program codes.

Figure 6:
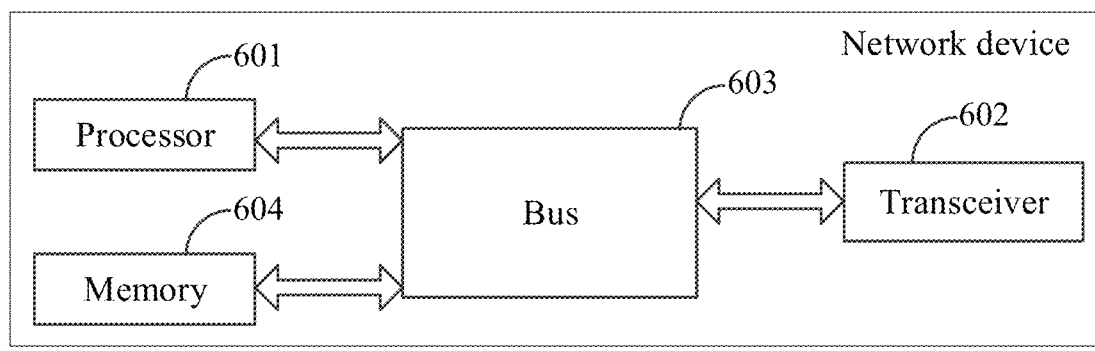
FIG. 6 is a structural schematic diagram of another network device provided by the embodiments of the application.

Based on the above embodiment, the embodiments of the present application also provide a network device, which can adopt the method provided in the embodiment corresponding to FIG. 2 and can be the same as the network device shown in FIG. 5. Referring to FIG. 6, the network device includes a processor 601, a transceiver 602, a bus 603 and a memory 604, where:

the processor 601 is configured to read a program in the memory 604 and execute the following procedures:

the processor 601 is configured to determine the first correspondence relationship, where the first correspondence relationship includes the correspondence relationship between the value range of the channel state information and the grade corresponding to the terminal device; determine the second correspondence relationship, where the second correspondence relationship includes the correspondence relationship between the grade corresponding to the terminal device and the set of the uplink transmission resources; and control the transceiver 602 to broadcast the determined first correspondence relationship and second correspondence relationship to the terminal device, where the first correspondence relationship and the second correspondence relationship are used for the terminal device to select the uplink transmission resources; and the transceiver 602 is configured to receive and transmit data under the control of the processor 601.

In one embodiment, the higher the grade corresponding to the terminal device in the second correspondence relationship, the better the quality of the uplink transmission resources included in the set of the uplink transmission resources corresponding thereto.

In one embodiment, the processor 601 is further configured to: control the transceiver 602 to receive the channel state information from at least one terminal device; update the first correspondence relationship based on the channel state information of the at least one terminal device; and control the transceiver 602 to broadcast the updated first correspondence relationship to the terminal device.

In one embodiment, when updating the first correspondence relationship based on the received the channel state information of the at least one terminal device, the processor 601 is configured to: according to the channel state information of the at least one terminal device and the first correspondence relationship, determine the grade corresponding to each of the at least one terminal device; and for any grade, determine the adjustment information corresponding to the grade according to the channel state information of the terminal device corresponding to the grade, and update the value range of the channel state information corresponding to the grade in the first correspondence relationship according to the adjustment information corresponding to the grade, where the adjustment information of each grade includes one piece or a combination of the following information: a reception overload rate, a transmission overload rate, and an effective overload rate.

In one embodiment, when updating the value range of the channel state information corresponding to the grade in the first correspondence relationship according to the adjustment information corresponding to the grade, the processor 601 is configured to:

when the adjustment information includes the reception overload rate and/or the effective overload rate, for the same grade, if the adjustment information corresponding to the grade is less than a first threshold, narrow the value range of the channel state information corresponding to the grade in the first correspondence relationship; if the adjustment information is greater than a second threshold, expand the value range of the channel state information corresponding to the grade in the first correspondence relationship, where the first threshold is less than or equal to the second threshold; or when the adjustment information includes the transmission overload rate, for the same grade, if the transmission overload rate is greater than a third threshold, narrow the value range of the channel state information corresponding to the grade in the first correspondence relationship; and if the transmission overload rate is less than a fourth threshold, expand the value range of the channel state information corresponding to the grade in the first correspondence relationship, where the third threshold is greater than or equal to the fourth threshold.

In one embodiment, the channel state information includes one or a combination of the following: the received power of reference signals, the received strength of pilot signals, and the signal-to-noise ratio.

In one embodiment, the uplink transmission resources include one or a combination of the following: time domain resources, frequency domain resources, and code domain resources.

The processor 601, the transceiver 602, and the memory 604 are connected to one another via the bus 603. The bus 603 may be a PCI bus or an EISA bus or the like. The bus can be divided into address bus, data bus, control bus, etc.

In FIG. 6, a bus architecture may include any number of interconnected buses and bridges, and particularly connects various circuits of one or more processors represented by the processor 601 and memories represented by the memory 604. The bus architecture can also link together various other circuits such as peripheral devices, voltage regulators, power management circuits, etc., which are well known in the art, and therefore will not be further described herein. A bus interface provides an interface. The transceiver 602 may be a plurality of elements, i.e., including a transmitter and a receiver, providing devices for communicating with various other devices over a transmission medium. The processor 601 is responsible for managing the bus architecture and normal processing, and the memory 604 can store data used by the processor 601 for operation.

In one embodiment, the processor 601 may be a central processing device, ASIC, FPGA or CPLD.

The embodiments of the present application may be provided as methods, systems, or computer program products. Therefore, the present application may take the form of a full hardware embodiment, a full software embodiment, or an embodiment combining software and hardware aspects. Furthermore, the present application may take the form of a computer program product implemented on one or more computer usable storage media (including but not limited to a magnetic disk memory, a CD-ROM, an optical memory, etc.) having computer usable program code embodied therein.

The present application is described with reference to flowcharts and/or block diagrams of the method, device (system), and computer program product according to the embodiments of the present application. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing apparatus to produce a machine, and the instructions executed by the processor of the computer or other programmable data processing apparatus produce a device for implementing the functions specified in one or more flows in the flowcharts and/or one or more blocks in the block diagrams.

These computer program instructions may also be stored in a computer-readable memory which can direct the computer or other programmable data processing apparatus to function in a particular manner, and the instructions stored in the computer-readable memory produce an article of manufacture including an instruction device which implements the functions specified in one or more flows in the flowcharts and/or one or more blocks in the block diagrams.

These computer program instructions may also be loaded onto the computer or other programmable data processing apparatus and a series of operational steps are performed on the computer or other programmable apparatus to produce computer implemented processing, and the instructions executed on the computer or other programmable apparatus provide steps for implementing the functions specified in one or more flows in the flowcharts and/or one or more blocks in the block diagrams.

What is claimed is:

1. A resource allocation method, comprising:
receiving, by a terminal device, a first correspondence relationship and a second correspondence relationship broadcast by a network device, wherein the first correspondence relationship comprises a correspondence relationship between a value range of channel state information and a grade corresponding to the terminal device, and the second correspondence relationship comprises a correspondence relationship between the grade corresponding to the terminal device and a set of uplink transmission resources;
determining, by the terminal device, a value of channel state information of the terminal device, and determining, by the terminal device, the grade corresponding to the terminal device according to the value of channel state information of the terminal device and the first correspondence relationship; and
determining, by the terminal device, a set of the uplink transmission resources corresponding to the terminal device according to the grade corresponding to the terminal device and the second correspondence relationship, and selecting, by the terminal device, an uplink transmission resource from the determined set of the uplink transmission resources;
wherein the method further comprises:
reporting, by the terminal device, a value of the channel state information of the terminal device to the network device, wherein a reported value of channel state information is used for the network device to update the first correspondence relationship in such a way that:
determining a grade corresponding to each of at least one terminal device comprising the terminal device according to channel state information received from the at least one terminal device and the first correspondence relationship;
for any grade, determining adjustment information corresponding to any grade according to channel state information of a terminal device corresponding to any grade, and updates a value range of the channel state information corresponding to any grade in the first correspondence relationship according to the adjustment information corresponding to any grade;
wherein the adjustment information includes one piece or a combination of following information: a reception overload rate, a transmission overload rate, and an effective overload rate.

2. The method according to claim 1, wherein a higher the grade corresponding to the terminal device in the second correspondence relationship, a higher a quality of an uplink transmission resource included in the set of the uplink transmission resources corresponding to the grade.

3. The method according to claim 1, further comprising:
receiving, by the terminal device, an updated first correspondence relationship broadcast by the network device; and determining, by the terminal device, the grade corresponding to the terminal device according to the value of the channel state information of the terminal device and the updated first correspondence relationship.

4. The method according to claim 1, wherein the channel state information includes one or a combination of following: a received power of reference signals, a received strength of pilot signals, and a signal-to-noise ratio.

5. The method according to claim 1, wherein the uplink transmission resources include one or a combination of following: time domain resources, frequency domain resources, and code domain resources.

6. A resource allocation method, comprising:
  determining, by a network device, a first correspondence relationship, wherein the first correspondence relationship comprises a correspondence relationship between a value range of channel state information and a grade corresponding to a terminal device;
  determining, by the network device, a second correspondence relationship, wherein the second correspondence relationship comprises a correspondence relationship between the grade corresponding to the terminal device and a set of uplink transmission resources; and
  broadcasting, by the network device, the first correspondence relationship and the second correspondence relationship to the terminal device, wherein the first correspondence relationship and the second correspondence relationship are used for the terminal device to select an uplink transmission resources;
  wherein the method further comprises:
  receiving, by the network device, channel state information from at least one terminal device;
  updating, by the network device, the first correspondence relationship based on the channel state information of the at least one terminal device; and
  broadcasting, by the network device, an updated first correspondence relationship to the terminal device;
  wherein the network device updating the first correspondence relationship based on a received channel state information of the at least one terminal device comprises:
  determining, by the network device, according to the channel state information of the at least one terminal device and the first correspondence relationship, a grade corresponding to each of the at least one terminal device;
  for any grade, determining, by the network device, adjustment information corresponding to any grade according to channel state information of a terminal device corresponding to any grade, and updates a value range of the channel state information corresponding to any grade in the first correspondence relationship according to the adjustment information corresponding to any grade;
  wherein the adjustment information includes one piece or a combination of following information: a reception overload rate, a transmission overload rate, and an effective overload rate.

7. The method according to claim 6, wherein a higher the grade corresponding to the terminal device in the second correspondence relationship, a higher a quality of the uplink transmission resources included in the set of the uplink transmission resources corresponding to the grade.

8. The method according to claim 6, wherein the network device updating the value range of the channel state information corresponding to any grade in the first correspondence relationship according to the adjustment information corresponding to any grade comprises:
  when the adjustment information includes the reception overload rate and/or the effective overload rate, for a same grade, if the adjustment information corresponding to the same grade is less than a first threshold, narrowing, by the network device, the value range of the channel state information corresponding to the same grade in the first correspondence relationship; if the adjustment information is greater than a second threshold, expanding, by the network device, the value range of the channel state information corresponding to the same grade in the first correspondence relationship, wherein the first threshold is less than or equal to the second threshold; or
  when the adjustment information includes the transmission overload rate, for a same grade, if the transmission overload rate is greater than a third threshold, narrowing, by the network device, the value range of the channel state information corresponding to the same grade in the first correspondence relationship; and if the transmission overload rate is less than a fourth threshold, expanding, by the network device, the value range of the channel state information corresponding to the same grade in the first correspondence relationship, wherein the third threshold is greater than or equal to the fourth threshold.

9. The method according to claim 6, wherein the channel state information includes one or a combination of following: a received power of reference signals, a received strength of pilot signals, and a signal-to-noise ratio.

10. The method according to claim 6, wherein the uplink transmission resources include one or a combination of following: time domain resources, frequency domain resources, and code domain resources.

11. A terminal device, comprising:
  a processor and a memory, wherein:
  the processor is configured to read a program in the memory and execute following procedures:
  controlling a transceiver to receive a first correspondence relationship and a second correspondence relationship broadcast by a network device, wherein the first correspondence relationship comprises a correspondence relationship between a value range of channel state information and a grade corresponding to the terminal device, and the second correspondence relationship comprises a correspondence relationship between the grade corresponding to the terminal device and a set of uplink transmission resources;
  determining a value of channel state information of the terminal device and determining the grade corresponding to the terminal device according to the value of channel state information of the terminal device and the first correspondence relationship received by the transceiver; and
  determining a set of the uplink transmission resources corresponding to the terminal device according to the grade corresponding to the terminal device and the second correspondence relationship received by the transceiver, and selecting an uplink transmission resource from the determined set of the uplink transmission resources;
  the processor is further configured to read the program in the memory and execute following procedures:
  reporting a value of the channel state information of the terminal device to the network device, wherein a reported value of channel state information is used for the network device to update the first correspondence relationship in such a way that:

determining a grade corresponding to each of at least one terminal device comprising the terminal device according to channel state information received from the at least one terminal device and the first correspondence relationship;

for any grade, determining adjustment information corresponding to any grade according to channel state information of a terminal device corresponding to any grade, and updates a value range of the channel state information corresponding to any grade in the first correspondence relationship according to the adjustment information corresponding to any grade;

wherein the adjustment information includes one piece or a combination of following information: a reception overload rate, a transmission overload rate, and an effective overload rate.

12. A network device, comprising:

a processor and a memory, wherein:

the processor is configured to read a program in the memory and execute following procedures:

determining a first correspondence relationship, wherein the first correspondence relationship comprises a correspondence relationship between a value range of channel state information and a grade corresponding to a terminal device;

determining a second correspondence relationship, wherein the second correspondence relationship comprises a correspondence relationship between the grade corresponding to the terminal device and a set of uplink transmission resources; and controlling a transceiver to broadcast the first correspondence relationship and the second correspondence relationship to the terminal device, wherein the first correspondence relationship and the second correspondence relationship are used for the terminal device to select an uplink transmission resources;

the processor is further configured to read the program in the memory and execute following procedures:

receiving channel state information from at least one terminal device;

updating the first correspondence relationship based on the channel state information of the at least one terminal device; and controlling a transceiver to broadcast an updated first correspondence relationship to the terminal device;

wherein updating the first correspondence relationship based on a received channel state information of the at least one terminal device comprises:

determining a grade corresponding to each of the at least one terminal device, according to the channel state information of the at least one terminal device and the first correspondence relationship;

for any grade, determining, by the network device, adjustment information corresponding to any grade according to channel state information of a terminal device corresponding to any grade, and updates a value range of the channel state information corresponding to any grade in the first correspondence relationship according to the adjustment information corresponding to any grade;

wherein the adjustment information includes one piece or a combination of following information: a reception overload rate, a transmission overload rate, and an effective overload rate.

13. The terminal device according to claim 11, wherein a higher the grade corresponding to the terminal device in the second correspondence relationship, a higher a quality of an uplink transmission resource included in the set of the uplink transmission resources corresponding to the grade.

14. The network device according to claim 12, wherein a higher the grade corresponding to the terminal device in the second correspondence relationship, a higher a quality of the uplink transmission resources included in the set of the uplink transmission resources corresponding to the grade.

* * * * *